2,900,756
ATTRACTANTS FOR THE GYPSY MOTH

Martin Jacobson, Washington, D.C.

No Drawing. Application December 9, 1958
Serial No. 779,259

4 Claims. (Cl. 43—124)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

The patent rights for the United States in any invention in the patent to be granted on this application are dedicated to the public.

This invention relates to a method of using certain organic compounds for attracting and trapping male gypsy moths in a field for the purpose of detecting gypsy moth infestation therein, and thereafter controlling such detected infestation by conventional means.

The gypsy moth, *Porthetria dispar* (L.) does serious damage to forest and shade trees in the New England and eastern New York State areas of the United States. The caterpillars, or larvae, of these moths eat the leaves of trees and thereby retard the growth and otherwise weaken the trees. The death of trees may be caused by a single or repeated defoliations, e.g. white pines and some other conifers die almost always after a single stripping of the foilage. Based on a twenty-year study, the losses in hardwood trees killed have been estimated to run in the tens of millons of dollars.

The United States Department of Agriculture has prevented this serious insect pest from spreading from the infested areas to the other susceptible forest lands of the United States by presently employing a unique means to detect the insect, followed by spraying with a toxicant therefor such as DDT in those areas where the moth is found, usually by airplane. To survey extensive areas for detecting the presence of the moth, traps are baited with the natural female sex lure which attracts adult male moths from distances of ½ mile or more. The lure is obtained by clipping the last two abdominal segments of the virgin female moth, extracting the segments with benzene and processing the extract chemically to stabilize the lure. This is an expensive procedure since large numbers of female pupae have to be collected in the field and the moths allowed to emerge before the segments can be clipped. Furthermore, emergence of moths from the pupae usually runs only 40 to 60%. A very serious difficulty arises from the fact that as the gypsy moth population diminishes, it becomes increasingly difficult to obtain the female pupae needed for lure production. To eliminate this difficulty a substitute is needed to replace the natural attractant and is provided by this invention.

According to the invention, therefore, a method is provided for detecting gypsy moth infestation in a field. This method involves trapping male gypsy moths by baiting a trap with the compound 1,2-hexadecanediol having the formula

or the compound 1,2-epoxyhexadecane having the formula

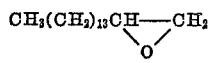

or mixtures of these compounds as the attractant or lure for the male gypsy moth.

A commercially available formulation has also been found to be highly effective as an attractant for the male gypsy moth. This formulation, which contains the above-mentioned compounds, is a colorless, practically odorless liquid with a freezing point of 14°–15° C. and a refractive index at 25° C. of 1.4436–1.4446, and consists of the following components:

11% of 1,2-epoxytetradecane
60% of 1,2-epoxyhexadecane (the active attractant described above)
22% of 1,2-epoxyoctadecane
2% of 1,2-epoxyeicosane
5% of hydroxyl—containing compounds which include a small amount of 1,2-hexadecanediol (the active attractant described above), and which is also believed to include a monoacetate ester of said 1,2-hexadecanediol.

Of the above-listed ingredients in the said formulation, only the 1,2-epoxyhexadecane and the 5% hydroxyl-containing fraction are active attractants for the male gypsy moth. The other recited ingredients are inactive for this purpose.

The said formulation attracts the male gypsy moths in the field after an induction period. While the 1,2-epoxyhexadecane is, per se, an attractant for the male moth, it is believed that hydration thereof during the induction period occurs to produce a considerable amount of the 1,2-hexadecanediol which is strongly attractive.

The trap may be baited in various ways. In one example in baiting the trap, a piece of filter paper, cloth, or other absorbent material, is impregnated with the attractant and placed within a hollow cylindrical can, each end of which is capped with a cardboard cone having a hole in its center to allow the male gypsy moth to enter. A sheet of cardboard lines the inside of the can and is covered on its inside surface with a sticky material which prevents the escape of the moth. Such a trap is disclosed on page 697 in the article entitled "The Gypsy Moth" by John M. Corliss, published in the Yearbook of Agriculture (Insects) of the United States Department of Agriculture for 1952, pages 694–698. The aforedescribed trap is substantially identical to the trap depicted on page 697 of this article with the sole modification that it utilizes cardboard cones instead of screen wire cones. Another such trap, this one using cardboard cones, is depicted on pages 81 in the article entitled "Portugal Aids the United States in Fighting the Gypsy Moth" by James O. Howard, published in Foreign Agriculture issued by the Foreign Agricultural Service of the United States Department of Agriculture, vol. 17, No. 4, April 1953, pages 81–83.

After ascertaining the number of male gypsy moths thus trapped and thereby determining if infestation of the field exists, steps for controlling the infestation can accordingly be then taken, for example, by conventional spraying of the field with a gypsy moth toxicant, such as DDT.

The 1,2-hexadecanediol may be prepared as follows:

To a well-stirred mixture of 22.5 grams (0.1 mole) of 1-hexadecene and 145 ml. of 98–100% formic acid at 25°, 14.05 grams of 25.6% hydrogen peroxide (5% excess) is added in one portion. The mixture is heated and stirred for about 24 hours at 40°, the formic acid is recovered under reduced pressure, and the distillation residue is refluxed for one hour with excess 3 N ethanolic potassium hydroxide. Most of the ethanol is then evaporated, and a large quantity of hot water is added, precipitating the diol as an oil which solidifies on cooling to gvie the crude desired product (95% yield) as a white solid, M.P. 68–69°. Although the pure diol, M.P. 75–

76°, can be obtained by recrystallization from methanol, the crude product may be used directly as the attractant.

The 1,2-epoxyhexadecane may be prepared as follows:

A mixture of 27.6 grams (0.15 mole) of 1-hexadecene and 204 grams of approximately 0.9 molar peracetic acid solution (0.18 mole) was stirred at 20–25° C. for 28 hours, then poured into cold water and extracted with ether. The ether extract was washed several times with water and the ether was evaporated. The residue was distilled and the liquid (18 grams; 60%) boiling at 104–106° (0.2 mm. Hg) was purified by dissolving it in petroleum ether (B.P. 40–60°) and passing the solution through a column of silicic acid. Evaporation of the eluted petroleum ether left 17.5 grams of pure 1,2-epoxyhexadecane, M.P. 21–22°, refractive index 1.4415 at 25° C.

The effectiveness of the attractants of the invention has been demonstrated by tests in the field and in the laboratory. In carrying out field tests, 0.25–1.00 gram of the attractant is placed on a filter paper cartridge which is held inside a hollow cylindrical can 7 inches long and 4 inches in diameter. Each end of the can is capped with a cardboard cone which has a hole at its center to allow the moth to enter. A sheet of cardboard lines the inside of the trap and is covered on its inner surface with a sticky material which prevents the escape of the moth. The traps are exposed during the flight season of the moth. The potency of the attractant is determined by comparing the catch of the attractant with that obtained with the natural lure.

For example, in a practical application in the field the natural attractant at the equivalent of twelve female gypsy moth abdominal tips caught a total of 94 male gypsy moths in 3 weeks, and a concentration of 0.25 gram of the aforedescribed formulation caught a total of 50 male gypsy moths in the same period.

Laboratory tests are carried out by exposing the attractant to moths immobilized with a device that holds their wings together. The natural attractant elicits a complex response that is duplicated by the attractants of the invention when the materials on filter paper, glass rods, or in vials are held between 1 and 2 centimeters and slightly above the antennal extremities. Activity usually consists of flicking movements of both antennae, followed by rapid vibrations of the wings and spreading movements of the legs. Then the abdomen usually bends in the direction of the odor source. For example, in a practical demonstration in the laboratory the natural attractant at the equivalent of 6–12 female abdominal tips evoked a response that was given an arbitrary rating of +5. The aforesaid formulation and 1,2-hexadecanediol, each at about 10 milligrams, evoked responses of +4 each, and the 1,2-epoxyhexadecane, also at about 10 milligrams evoked a response of +2.

The reaction of the gypsy moth to the $C_{16}$ diol (1,2-hexadecanediol) is very specific since a similar attraction is not exhibited by the corresponding $C_{14}$ or $C_{18}$ compounds.

The attractants of the invention may be used in actual practice in the field in different ways as is known in the art. It may be formulated with other materials or impregnated on a carrier or used in traps or similar devices different from the one described above.

Having thus described my invention, what is claimed is:

1. A method for detecting infestation of gypsy moth in a field comprising baiting a trap with a member selected from the group consisting of 1,2-hexadecanediol, 1,2-epoxyhexadecane, and mixtures thereof as an attractant for the male gypsy moth.

2. A method for detecting infestation of gypsy moth in a field comprising baiting a trap with 1,2-hexadecanediol as an attractant for the male gypsy moth.

3. A method for detecting infestation of gypsy moth in a field comprising baiting a trap with 1,2-epoxyhexadecane as an attractant for the male gypsy moth.

4. A method for detecting infestation of gypsy moth in a field comprising baiting a trap with a mixutre containing 1,2-hexadecanediol and 1,2-epoxyhexadecane as an attractant for the male gypsy moth.

References Cited in the file of this patent

Chemical Insect Attractants and Repellants, V. G. Dethier, pages 175, 195. Published 1947 by The Blakiston Co., Philadelphia, Pa.

Chemicals Evaluated as Insecticides and Repellants by W. V. King. Published 1954 by U.S. Dept. of Agriculture as "Agriculture Handbook No. 69," page 187.